United States Patent
Lee et al.

(10) Patent No.: US 7,099,397 B2
(45) Date of Patent: Aug. 29, 2006

(54) RECEIVER OF AN ORTHOGONAL FREQUENCY DIVISION MULTIPLEXING SYSTEM

(75) Inventors: Goon Seop Lee, Gyeonggi-do (KR); Dong Hahk Lee, Gyeonggi-do (KR); Jong Tae Ihm, Gyeonggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 750 days.

(21) Appl. No.: 10/253,830

(22) Filed: Sep. 23, 2002

(65) Prior Publication Data

US 2003/0058953 A1 Mar. 27, 2003

(30) Foreign Application Priority Data

Sep. 24, 2001 (KR) ............................. 2001-58948

(51) Int. Cl.
*H04K 1/10* (2006.01)
*H04J 11/00* (2006.01)

(52) U.S. Cl. ...................... 375/260; 370/210
(58) Field of Classification Search ............. 375/222, 375/260, 340, 346, 349; 370/208, 210; 708/404, 708/405

See application file for complete search history.

(56) References Cited

U.S. PATENT DOCUMENTS

| | | | |
|---|---|---|---|
| 6,594,320 B1* | 7/2003 | Sayeed | 375/281 |
| 6,839,388 B1* | 1/2005 | Vaidyanathan | 375/326 |
| 6,961,393 B1* | 11/2005 | Cupo et al. | 375/343 |
| 2002/0145969 A1* | 10/2002 | Sayeed | 370/206 |
| 2002/0176520 A1* | 11/2002 | Heegard et al. | 375/327 |
| 2002/0186799 A1* | 12/2002 | Sayeed | 375/345 |

* cited by examiner

*Primary Examiner*—Young T. Tse
(74) *Attorney, Agent, or Firm*—Sheridan Ross P.C.

(57) ABSTRACT

In an orthogonal frequency division multiplexing (OFDM) system, a receiver includes a received signal transformer, a frequency offset estimator and a frequency compensator. The received signal transformer removes from a training symbol a guardtone and a sub-carrier deviated from a mean value of effective sub-carrier signals by over a predetermined value. The frequency offset estimator estimates the frequency offset of the OFDM digital signal and the frequency compensator compensates the frequency offset of received signals by using the estimated frequency offset. Thus, data transmission efficiency can be greatly improved and influence from a frequency-selective noise channel can be minimized. Further, by removing data unnecessary for the frequency offset estimation, the calculation amount can be reduced.

4 Claims, 3 Drawing Sheets

RECEIVER OF AN ORTHOGONAL FREQUENCY DIVISION MULTIPLEXING SYSTEM

FIELD OF THE INVENTION

The present invention relates to an orthogonal frequency division multiplexing (OFDM) system; and, more particularly, to a receiver of an OFDM system for estimating a frequency offset of a baseband OFDM signal by using a training symbol configured to be adequate for frequency offset estimation.

BACKGROUND OF THE INVENTION

In general, an OFDM technology has its applications in various digital data transmission systems such as a digital audio broadcasting (DAB), a digital television, a wireless local area network (WLAN), a wireless asynchronous transfer mode (WATM), etc. The OFDM is a multiple-carrier signal transmission technology where data modulated by a plurality of carrier signals are transmitted in parallel. Though conventional OFDM systems have not been widely used due to their structural complicities, recent development of various digital signal processing technologies such as a fast fourier transform (FFT) and an inverse FFT allows for commercial realizations of the OFDM systems in various fields. Though the OFDM method is similar to a conventional FDM method, its technical essence lies in that data transmission is performed while maintaining orthogonality between sub-carriers, thus obtaining optimum transmission efficiency for a high-speed data transmission. Accordingly, there have been suggested increasing number of data transmission technologies employing the OFDM method such as an OFDM/CDMA for use in a WATM system.

Referring to FIG. 1, there is provided a receiver of a conventional OFDM system.

The receiver of the OFDM system includes an A/D converter 10, a multiplier 12, a guard interval remover 14, a fast fourier transformer (FFT) 16, a frequency offset estimator 30 having a fine frequency offset estimator 18 and a coarse frequency offset estimator 20, and an adder 22.

The A/D converter 10 converts a baseband analog signal, received by a RF (radio frequency) receiver (not shown) and provided thereto, into a digital signal and then provides the digital data to the multiplier 12. The multiplier 12 compensates a frequency error included in the digital signal by using a predetermined frequency correction signal inputted from the adder 22, thus obtaining a sampled data signal.

Then, the guard interval remover 14 removes a guard interval from the signal outputted from the multiplier 12. To be more specific, the guard interval removing process involves the steps of: setting a window including two OFDM symbols and one guard interval; obtaining correlation values by moving the window on a sample basis on the outputted signal; defining a point in time when a maximum correlation value appears as a starting point of the guard interval; and removing from the outputted signal a data corresponding to the guard interval. The FFT 16 performs a fast fourier transformation on the data provided from the guard interval remover 14 to obtain stream type chip data. The chip data is sent to the frequency offset estimator 30.

Unless a transmitter and a receiver are synchronized during a local oscillating period in a data transmission system using the OFDM method, there may occur a frequency offset between the receiver and sub-carriers. If the frequency offset exists, interference between a received data and a neighboring channel may be incurred, so that the orthogonality between the sub-carriers may not be maintained. Thus, even a very minute offset can cause a deterioration of the efficiency of the receiving system. For this reason, the frequency offset estimator 30 is required in a data transmission system employing the OFDM method in order to compensate such a frequency offset.

The frequency offset estimator 30 calculates a correlation value between the chip data, provided from the FFT 16, and a preset reference signal and, then, outputs an estimated frequency offset. Specifically, the coarse frequency offset estimator 20 outputs an initial frequency offset corresponding to an integer multiple of the interval between carriers while the fine frequency offset estimator 18 outputs a residual frequency offset left after the first synchronization which is equal to or smaller than the integer multiple of the carrier interval.

The adder 22 receives the initial frequency offset and the residual frequency offset provided from the frequency offset estimator 30 and then outputs an estimated frequency offset, which is inputted to the multiplier 12 to serve as the frequency correction signal.

However, the conventional frequency offset estimator 30 as described above has a drawback as follows. In case a temporal domain method is employed to estimate the frequency offset, the detection range for the frequency offset is limited to a maximum of four times of the carrier interval though a small amount of calculation is involved. A frequency domain method, on the other hand, involves a great amount of calculation since all the possible correlation functions for the intervals between the sub-carriers should be calculated though there is no limit to the detection range for the frequency offset.

Assume that the transmitter (not shown) performs the transmission of the data by using N number of sub-carriers and the receiver receives two training symbols for the frequency synchronization in the OFDM system. At this time, the estimated frequency offset outputted from the frequency offset estimator 30 is obtained by using an algorithm to be described in detail hereinafter.

Referring to FIG. 3, there is illustrated a structure of a training symbol applied to the present invention. The training symbol includes guardtones and effective carrier signals. The guardtones serve to prevent the occurrence of noises due to interferences between neighboring training symbols.

The two training symbols $X_1$, and $X_2$, which are outputted from the transmitter, are defined as follows:

$$X_1 = \sum_{k=0}^{N-1} X_1(k) \quad \text{Eq. 1}$$

$$X_2 = \sum_{k=0}^{N-1} X_2(k) \quad \text{Eq. 2}$$

wherein N represents the size of a data to be FFT-transformed; k, and index indicating a sub-carrier component; and $X_k$, a complex data allotted to a k-th sub-carrier.

The two signals $X_1$ and $X_2$ are transmitted through a transmission channel and received at the receiver as two received signals, $Y_1$ and $Y_2$, respectively. The received signals $Y_1$ and $Y_2$ are represented as follows.

$$Y_1(k) = X_1(k)H(k) + N(k) \quad \text{Eq. 3}$$

wherein H(k) stands for a channel transfer function for the k-th sub-carrier and N(k) represents a noise component in the k-th sub-carrier. The offset estimator 30 obtains an estimated frequency offset from the received training signals $Y_1$ and $Y_2$ and compensates frequency offsets ($f_{offset}$) of the received data signals by using an algorithm as follows.

$$f_{offset} = \frac{1}{2\pi}\arg\sum_{k=0}^{N-1} Y_2(k)Y_1^*(k) \qquad \text{Eq. 4}$$

However, in the offset estimation method using the frequency offset estimator 30 as described above, an excessively large amount of calculation is required since noise components generated by the guardtones, which have no transmission information, are also the subjects of calculation. Further, the offset estimation method using the frequency offset estimator 30 may accompany various problems such as an impulsive noise or a fading phenomenon caused by a frequency selection.

SUMMARY OF THE INVENTION

It is, therefore, an object of the present invention to provide a receiver of an orthogonal frequency division multiplexing (OFDM) system capable of estimating a frequency offset by removing a guardtone from a chip data outputted from a fast fourier transformer (FFT) and removing an impulsive interfering noise from remaining effective carrier signals included in the chip data.

In accordance with the present invention, there is provided a receiver of an orthogonal frequency division multiplexing (OFDM) system for estimating a frequency offset of an OFDM digital signal by using a training symbol for use in an OFDM modulation, wherein the training symbol includes a guardtone and effective sub-carrier signals, the receiver including: a received signal transformer for removing from the training symbol the guardtone and a sub-carrier deviated from a mean value of the effective sub-carrier signals by over a predetermined value; a frequency offset estimator for estimating the frequency offset of the OFDM digital signal by using a signal outputted from the received signal transformer and outputting a frequency correction signal for the estimated frequency offset; and a frequency compensator for compensating the frequency offset of the OFDM digital signal by using the frequency offset correction signal provided form the frequency offset estimator.

BRIEF DESCRIPTION OF THE DRAWINGS

The above and other object and features of the present invention will become apparent from the following description of a preferred embodiment given in conjunction with the accompanying drawings, in which.

DETAILED DESCRIPTION OF THE PREFERRED EMBODIMENT

Figure 1:
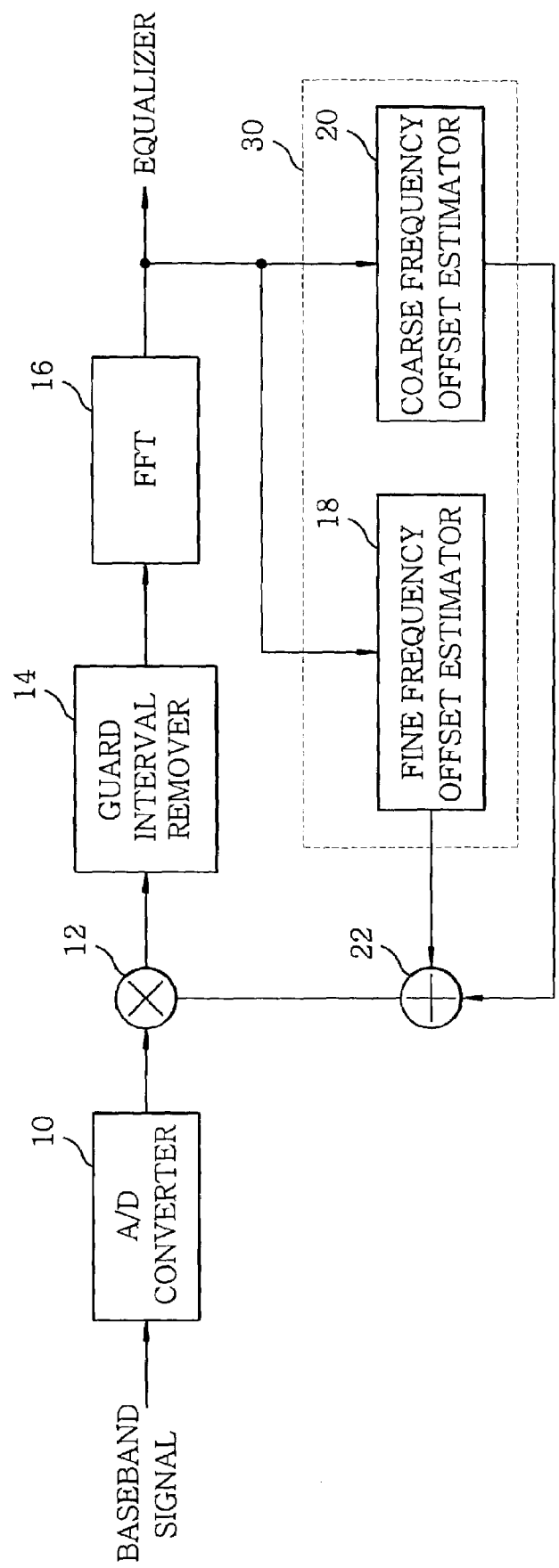
FIG. 1 offers a block diagram of a receiver for a conventional orthogonal frequency division multiple (OFDM) system.
Figure 2:
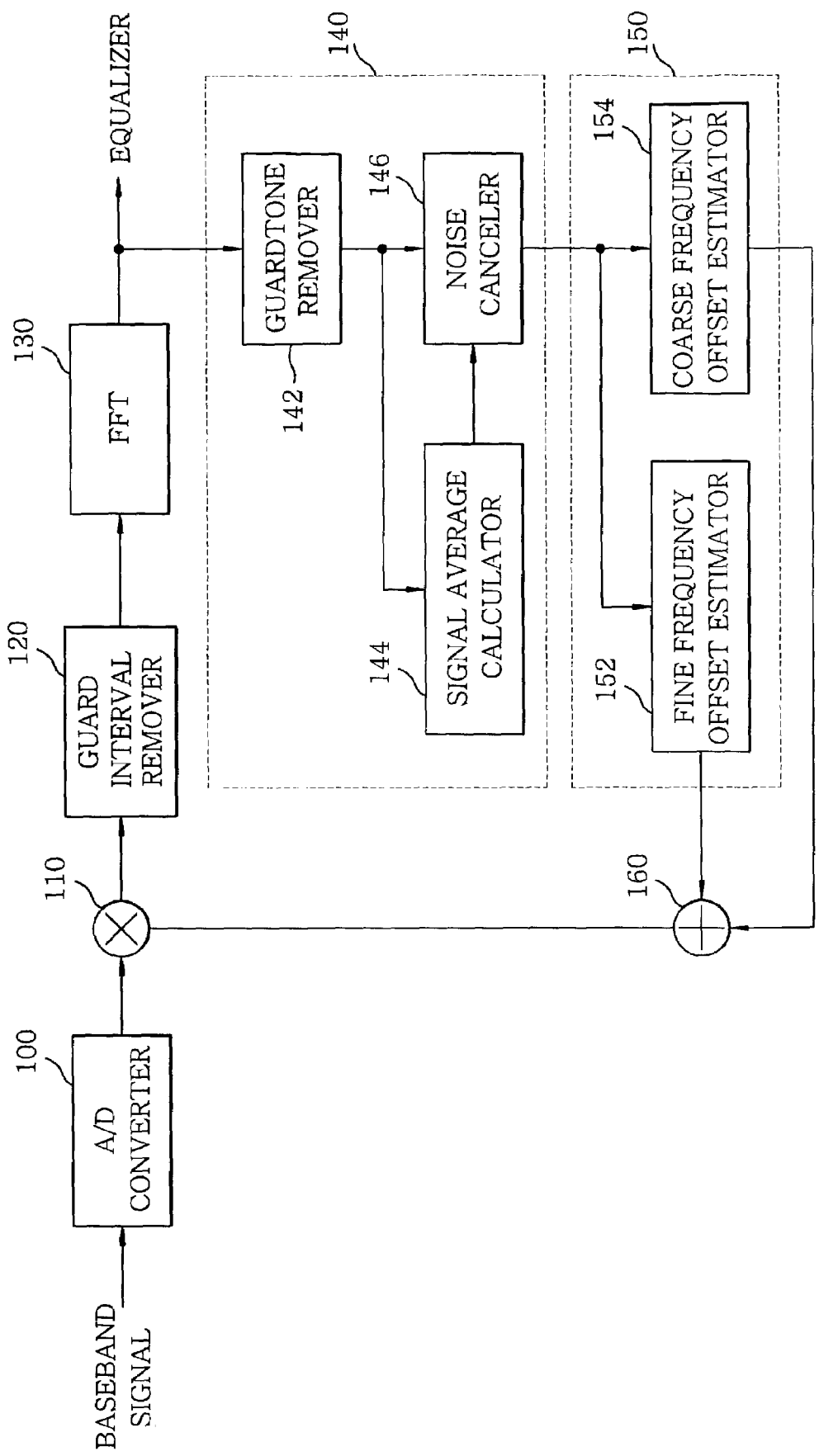
FIG. 2 provides a block diagram of a receiver for an OFDM system in accordance with the present invention.

Referring to FIG. 2, there is described a receiver of an OFDM system in accordance with the present invention.

The receiver of the OFDM system includes an A/D converter 100, a multiplier 110, a guard interval remover 120, a fast fourier transformer (FFT) 130, a received signal transformer 140, a frequency offset estimator 150 having a fine frequency offset estimator 152 and a coarse frequency offset estimator 154, and an adder 160.

The A/D converter 100 converts a baseband OFDM signal into a digital signal and provides the digital signal to the multiplier 110. Then, the multiplier 110 compensates a frequency error included in the digital signal by using a predetermined frequency offset correction signal inputted from the adder 160, thus obtaining a sampled data signal.

Thereafter, the guard interval remover 120 removes a guard interval from the signal outputted from the multiplier 110. To be specific, the guard interval removing process involves the steps of: setting a window including two OFDM symbols and one guard interval; obtaining correlation values by moving the window on a sample basis on the outputted signal; defining a point in time when a maximum correlation value appears as a starting point of the guard interval; and removing from the outputted signal a data corresponding to the guard interval. The FFT 130 performs a fast fourier transformation on N number of serial data outputted from the guard interval remover 120 to obtain parallel type chip data.

Figure 3:
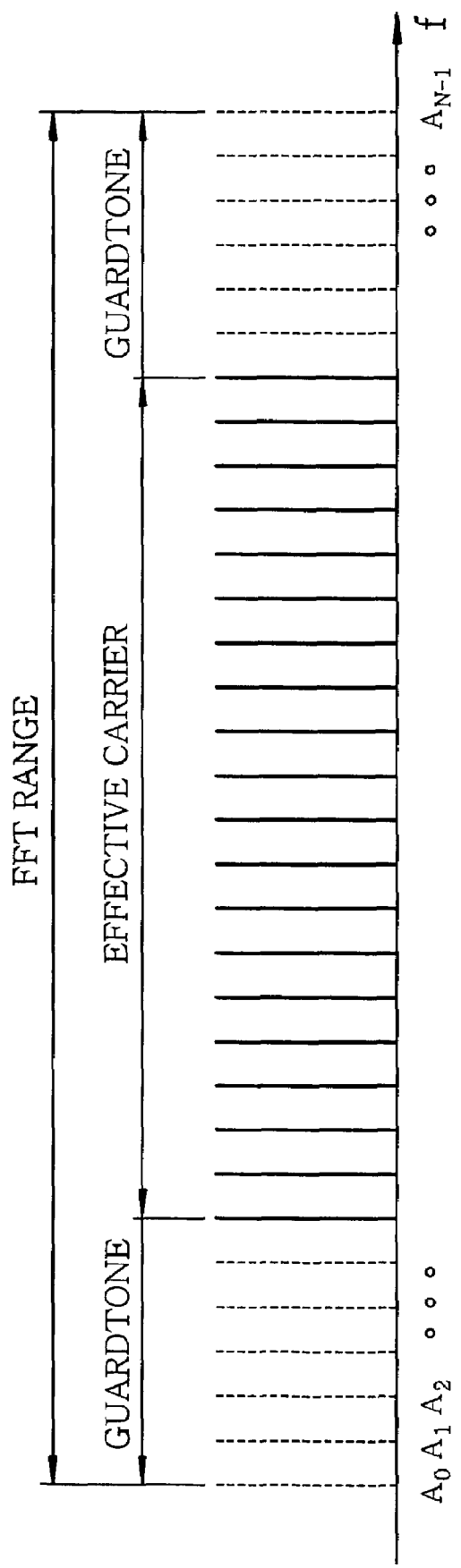
FIG. 3 describes a structure of a training symbol applied to the present invention.

The parallel type chip data (i.e., a FFT range of the training symbol shown in FIG. 3, the FFT range including guradtones and effective sub-carriers) is provided from the FFT 130 to the received signal transformer 140. The received signal transformer 140 includes a guardtone remover 142, a signal average calculator 144 and a noise canceller 146. The guardtone remover 142 removes from the FFT range a guardtone portion which is unnecessary for the frequency offset estimation. The signal average calculator 144 calculates a mean value of effective carrier signals left after the guardtone portion is removed. Then, the noise canceller 146 removes sub-carriers that are deviated from the mean value b over a predetermined value.

The signal average calculator 144 obtains the mean value of the effective carrier signals by employing equations as follows:

$$I_{average1} = \frac{1}{N-M}\sum_{k=0}^{N-1-M}|\text{Real}((Y_1(k))| \qquad \text{Eq. 5}$$

$$Q_{average1} = \frac{1}{N-M}\sum_{k=0}^{N-1-M}|\text{Imag}((Y_1(k))| \qquad \text{Eq. 6}$$

wherein $I_{average1}$ and $Q_{average1}$ represent real and imaginary components of the mean value, respectively; N, a size of a data to be FFT-transformed; M, a size of the removed guardtone portion; k, an index indicating a sub-carrier component; and Y1, a received training signal.

The frequency offset estimator 150 computes a correlation value between the chip data and a predetermined reference signal by using a signal outputted from the noise canceller 146 of the received signal transformer 140 and, then, outputs an estimated frequency offset. To be specific, the coarse frequency offset estimator 154 outputs an initial frequency offset corresponding to an integer multiple of the carrier interval while the fine frequency offset estimator 152 outputs a residual frequency offset left after the initial synchronization which is equal to or smaller than the integer multiple of the carrier interval.

The adder 160 receives the initial frequency offset and the residual frequency offset from the frequency offset estimator 150 and outputs an estimated frequency offset, which is inputted to the multiplier 110 to serve as the frequency correction signal.

The multiplier 110 receives the frequency correction signal from the adder 160 to compensate the frequency offset of the digital signal outputted from the A/D converter 100.

By using the receiver of the present invention as described above, a frequency offset can be precisely estimated, so that data transmission efficiency can be greatly improved and influence from a frequency-selective noise channel can be minimized. Further, by removing data unnecessary for the frequency offset estimation, the calculation amount can be reduced.

What is claimed is:

1. A receiver of an orthogonal frequency division multiplexing (OFDM) system for estimating a frequency offset of an OFDM digital signal by using a training symbol for use in an OFDM modulation, wherein the training symbol includes guardtones and effective sub-carrier signals, the receiver comprising:

a received signal transformer for removing from the training symbol a guardtone portion which is unnecessary for the frequency offset estimation and sub-carriers that are deviated from a mean value of the effective sub-carrier signals left after the guardtone portion is removed by over a predetermined value;

a frequency offset estimator for estimating the frequency offset of the OFDM digital signal by using a signal outputted from the received signal transformer and outputting a frequency correction signal for the estimated frequency offset; and a frequency compensator for compensating the frequency offset of the OFDM digital signal by using the frequency offset correction signal provided from the frequency offset estimator.

2. The receiver of claim 1, wherein the received signal transformer includes:

a guardtone remover for removing the guardtone portion of the training symbol;

a signal average calculator for calculating the mean value of the effective sub-carrier signals; and a noise canceller for removing the sub-carriers that are deviated from the mean value obtained by the signal average calculator by over the predetermined value.

3. The receiver of claim 2, wherein the signal average calculator obtains the mean value by employing the following equations:

$$I_{average1} = \frac{1}{N-M} \sum_{k=0}^{N-1-M} |\text{Real}((Y_1(k))|$$

$$Q_{average1} = \frac{1}{N-M} \sum_{k=0}^{N-1-M} |\text{Imag}((Y_1(k))|$$

wherein $I_{average1}$ and $Q_{average1}$ represent real and imaginary components of the mean value, respectively; N, a size of a data to be FFT-transformed; M, a size of the removed guardtone portion; k, an index indicating a sub-carrier component; and Y1, a received training signal.

4. The receiver of claim 1, wherein the frequency compensator is a multiplier.

* * * * *